United States Patent [19]

Crandall et al.

[11] Patent Number: 5,063,564
[45] Date of Patent: Nov. 5, 1991

[54] YELLOW ALARM CONTROL IN DS1 SF AND DS1 ESF TRANSCODING

[75] Inventors: John H. Crandall, Newton, N.H.; Stephen J. Davis, Methuen; Brett S. Reynolds, Salisbury, both of Mass.

[73] Assignee: AT&T Bell Laboratories, Murray Hill, N.J.

[21] Appl. No.: 491,368

[22] Filed: Mar. 9, 1990

[51] Int. Cl.⁵ ................................................ H04J 3/12
[52] U.S. Cl. ................................. 370/110.1; 370/105.1
[58] Field of Search ............... 370/110.1, 105.1, 105.2

[56] References Cited
U.S. PATENT DOCUMENTS 4,191,857  3/1980  McLaughlin et al. ........... 370/110.1
4,397,020  8/1983  Howson .............................. 370/105
4,757,499  7/1988  Gorshe ............................ 370/110.1
4,787,084 11/1988  Piercy ............................. 370/110.1

OTHER PUBLICATIONS

The Bell System Technical Journal, Nov. 1982, vol. 61, No. 9, Part 3.
AT&T Technical Advisory No. 70, Issue 2 "The Extended Framing Format Interface Specifications", Sep. 29, 1981.

Primary Examiner—Douglas W. Olms
Assistant Examiner—Dang Ton
Attorney, Agent, or Firm—Thomas Stafford

[57] ABSTRACT

In D4 channel banks operating in a DS1 Extended Super Frame (ESF) mode, it is possible for inband yellow alarm bits to corrupt data in applications involving unrestricted use of dataport type channel banks including 64 kilobit clear channel capability. A problem also exists in that the data being received in the ESF framing mode could emulate an inband yellow alarm condition, and cause alarm units in a receiving channel bank to declare a "false" yellow alarm condition. The inband yellow alarm problems are eliminated by inhibiting yellow alarm bits from being inserted into the frames of a DS1 Super Frame format during operation in the ESF framing mode, and by ignoring any possible inband yellow alarm bits being received during operation in the ESF framing mode.

16 Claims, 3 Drawing Sheets

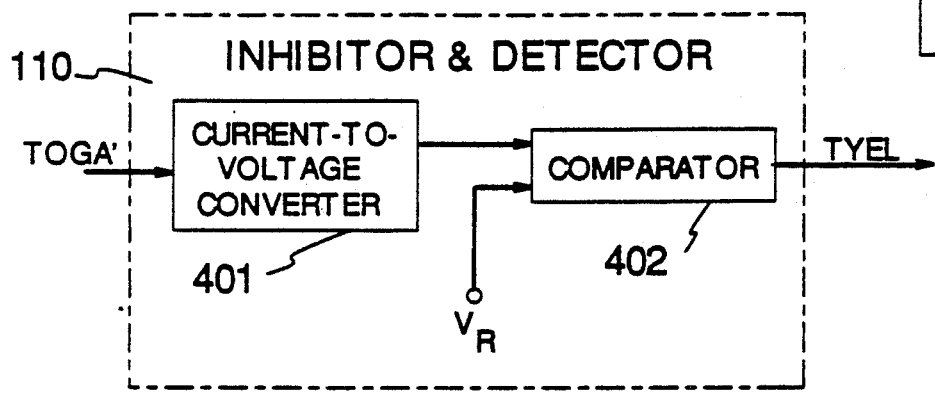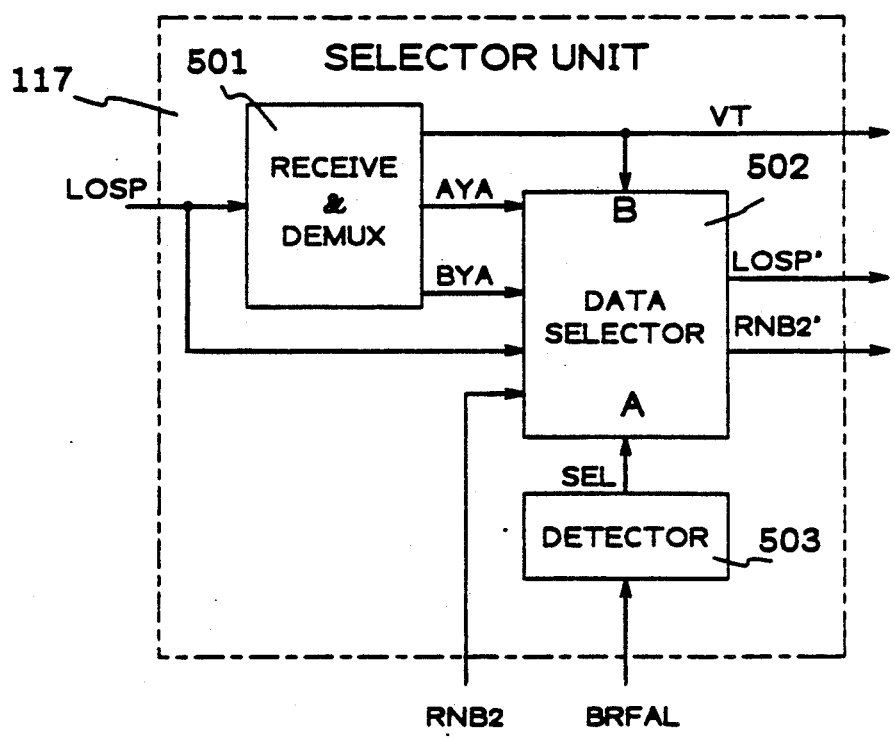

YELLOW ALARM CONTROL IN DS1 SF AND DS1 ESF TRANSCODING

TECHNICAL FIELD

This invention relates to digital transmission systems and, more particularly, to DS1 Super Frame (SF) and DS1 Extended Super Frame (ESF) transcoding.

BACKGROUND OF THE INVENTION

In existing D4 digital channel banks which include DS1 Super Frame (SF), DS1 Extended Super Frame (ESF) and unrestricted use of dataport type channel units including 64 kilobit clear channel capability, a problem exists regarding the emulation of an inband yellow alarm condition. As is known, in the DS1 SF format, yellow alarm information is transmitted inband by inserting logical 0's in bit position two (2) of each time slot in a frame. In the existing D4 channel bank transcoding process, the D4 DS1 Super Frames, including any inband yellow alarm bits or data patterns emulating a yellow alarm condition, are supplied, i.e., passed through, to a DS1 SF/ESF framer for transmission in the ESF format. In existing D4 channel bank receivers, received DS1 ESF frames including any inband yellow alarm bits, or data bits emulating a yellow alarm condition are passed through to frames in the D4 DS1 SF format. Consequently, any data being transmitted, for example, in a clear channel mode, could be corrupted by the inband yellow alarm transmission process. Additionally, any received data emulating a yellow alarm condition will cause the receiving channel bank to declare a "false" yellow alarm condition. Both of these situations are undesirable. Thus, although existing D4 channel banks including DS1 ESF format capability operate satisfactorily in most applications, they would operate unsatisfactorily in applications involving the unrestricted use of dataport type channel units including 64 kilobit clear channel capability.

SUMMARY OF THE INVENTION

The problems concerning yellow alarm conditions of the prior D4 DS1 SF format when operating in a DS1 ESF format mode are overcome, in accordance with this invention, in a channel bank by controllably inhibiting transmission of inband yellow alarm bits in the time slots of frames in the D4 DS1 SF format and by supplying yellow alarm condition information directly to a DS1 SF/ESF framer for insertion into a DS1 ESF data link. Similarly, in a receiver operating in a DS1 ESF format mode, any possible inband yellow alarm bits are ignored and only the DS1 ESF yellow alarm information from the ESF data link is directly utilized to declare a yellow alarm condition.

Additionally, the DS1 ESF yellow alarm information from DS1 SF/ESF re-framers in first and second digroups of the channel bank, is multiplexed and transmitted to first and second alarm units, respectively. The alarm units are also responsive to prescribed control signals to operate in either a "new" DS1 ESF yellow alarm mode, or an "old" DS1 SF yellow alarm mode. In the new DS1 ESF yellow alarm mode, the alarm units are operative to supply a current based signal representative of whether or not a DS1 ESF yellow alarm condition exists and to ignore any yellow alarm information from a corresponding receive unit including a DS1 SF re-framer. The current based signal is derived through voltage regulation by an inhibitor and detector unit in an associated line interface unit operating in the new ESF yellow alarm mode. When in the old DS1 SF yellow alarm mode, the alarm units are operative to supply a voltage based signal representative of whether or not a DS1 SF yellow alarm condition exists and, then, are responsive to DS1 SF yellow alarm information from corresponding receive units including a DS1 SF re-framer. The voltage based signal is derived because no votage regulation is present in the associated "old" line interface unit.

BRIEF DESCRIPTION OF THE DRAWING

In the Drawing:

FIG. 4 shows in simplified block diagram form details of the inhibitor and detector employed in digroups A and B of FIGS. 1 and 2;

FIG. 5 shows in simplified block diagram form details of the selector unit employed in the alarm units of FIGS. 1 and 2; and FIG. 6 shows a table useful in describing the operation of the selector unit of FIG. 5.

DETAILED DESCRIPTION

Figure 1:
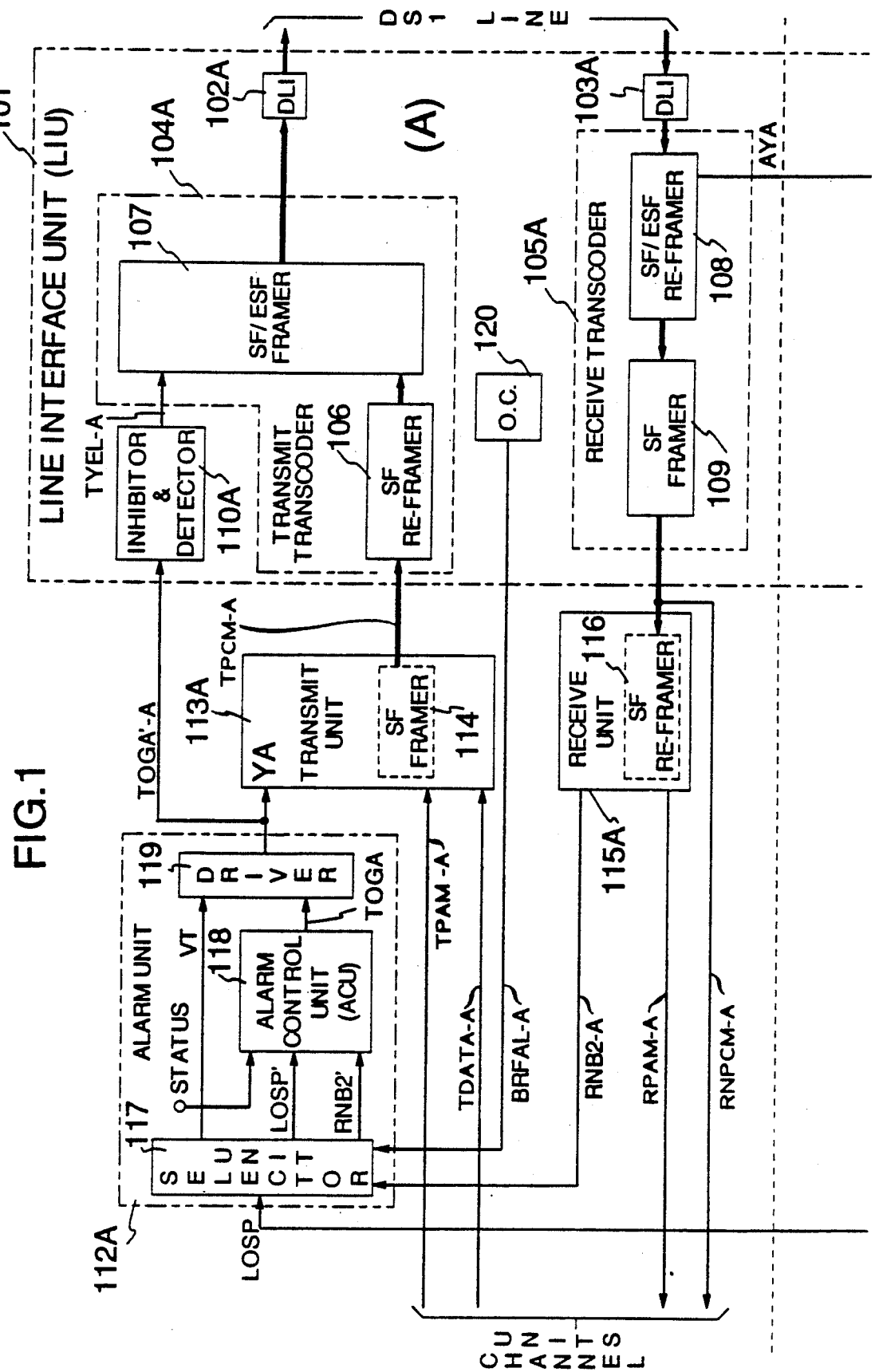
FIGS. 1 and 2 when connected as shown in FIG. 3 show in simplified form portions of common control equipment of a digital channel bank including an embodiment of the invention.
Figure 2:
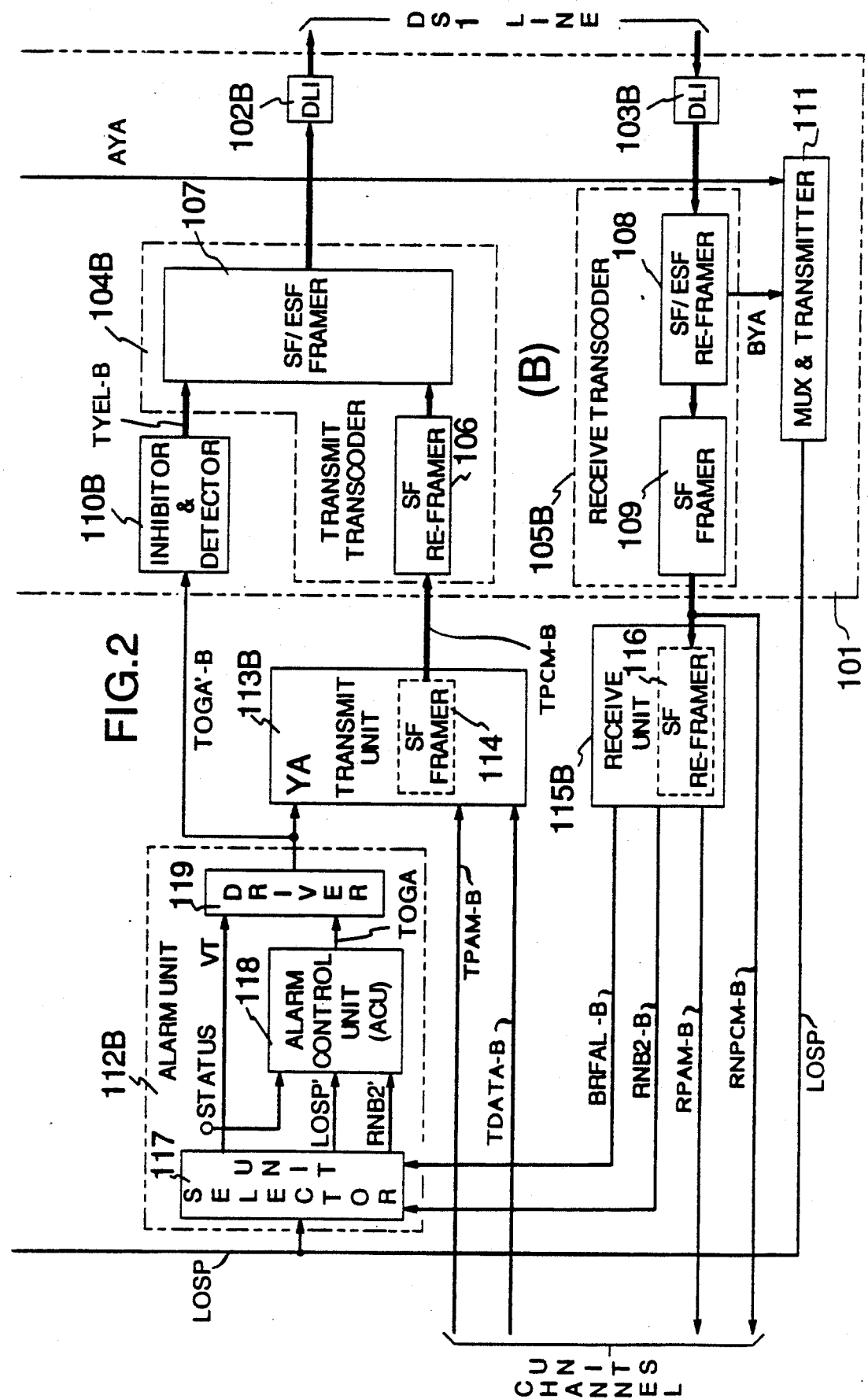

FIGS. 1 and 2 when connected as shown in FIG. 3 show portions of the common equipment of first and second digroups, namely, digroup A and digroup B, of a digital channel bank including an embodiment of the invention. Such digital channel banks are known in the art and are, for example, the D4 digital channel bank commercially available from American Telephone and Telegraph Company and described in several articles in the *Bell System Technical Journal*, Vol. 61, No. 9, Part 3, November 1982.

Accordingly, shown in FIGS. 1 and 2 is line interface unit (LIU) 101 which includes digital line interface (DLI) units 102A and 103A for interfacing digroup A to a DS1 digital line. Also included in line interface unit 101 are digital line interface (DLI) units 102B and 103B for interfacing digroup B to a DS1 digital line. Such digital line interface units are well known in the art. Transmit transcoder 104A and receive transcoder 105A for digroup A, and transmit transcoder 104B and receive transcoder 105B for digroup B are also included in line interface unit 101. Each of transmit transcoders 104A and 104B includes a Super Frame (SF) re-framer 106 and a Super Frame/Extended Super Frame (SF/ESF) framer 107. Such SF re-framers and SF/ESF framers are also well known in the art and are commercially available from a number of sources. The SF/ESF framers are also controllable to operate in either an SF frame mode or an ESF frame mode. As is known in the art, the selection of the particular frame mode is set upon installation of line interface unit 101 in the D4 digital channel bank. Similarly, each of receive transcoders 105A and 105B includes an SF/ESF re-framer 108 and a SF framer 109. Again, such SF/ESF re-framers and SF framers are also well known in the art and commercially available from a number of sources. The SF/ESF re-framers are also controllable to operate either in a SF re-frame mode or an ESF re-frame mode. The mode of operation is set upon installation of line interface unit 101 in the D4 digital channel bank, as indicated above. The DS1 Super Frame format is well known in the art and is described in the *Bell System Technical Journal* noted above. The DS1 Extended Super Frame format is also now well known in the art and is described in an AT&T Technical Advisory No. 70, dated Sept. 29, 1981. Also see U.S. Pat. No. 4,397,020, issued to R. D. Howson on Aug. 2, 1983.

Also included in line interface unit 101 are inhibitor and detector 110A for digroup A and inhibitor and detector 110B for digroup B. Each of inhibitor and detectors 110A and 110B is advantageously employed in the so-called new ESF yellow alarm mode, in accordance with the present invention, to originate a first control signal for inhibiting the supply of inband yellow alarm bits to corresponding ones of transmit units 113A and 113B, respectively, as will be described below, and for supplying yellow alarm information TYEL-A and TYEL-B to transmit transcoders 104A and 104B, respectively, and therein to SF/ESF framers 107.

Termination (OC) 120 is shown as being in line interface unit 101, however, in this application it is an open circuit which is realized by connecting an open circuited backplane connection to BRFAL-A. OC 120 is supplied as BRFAL-A to alarm unit 112A and is used therein to automatically determine the digroup that the particular alarm unit is operating in.

Yellow alarm information received from remote digroups A and B in a remote digital channel bank, or any other DS1 compatible equipment, when operating in the new ESF yellow alarm mode is obtained from the ESF data link by SF/ESF re-framers 108 in each of receive transcoders 105A and 105B, respectively. SF/ESF re-framer 108 in receive transcoder 105A yields the digroup A yellow alarm information, namely, AYA, and SF/ESF re-framer 108 in receive transcoder 105B yields the digroup B yellow alarm information, namely, BYA. The received yellow alarm information AYA and BYA is supplied to multiplexer (MUX) and transmitter 111 where it is multiplexed into signal LOSP, in well known fashion. Signal LOSP including any yellow alarm information AYA and BYA is supplied to alarm unit 112A and alarm unit 112B for use, as described below.

Also shown in FIGS. 1 and 2 are transmit unit 113A for digroup A and transmit unit 113B for digroup B. Each of transmit units 113A and 113B include among other elements SF framer 114 and a yellow alarm (YA) input. Supplied to transmit units 113A and 113B are TPAM-A and TPAM-B from corresponding channel units and TDATA-A and TDATA-B, respectively, from corresponding dataport type channel units, if equipped. Each of transmit units 113A and 113B is known in the art and is commercially available from American Telephone and Telegraph Company. In existing digital channel banks, including such transmit units, a yellow alarm indication is supplied to the YA input which causes a logical 0 to be inserted into bit position two (2) of the time slots of each DS1 SF frame, in well known fashion. These are the inband yellow alarm bits that were passed through to the SF/ESF framer 107 when operating in an ESF framing mode and which would corrupt transmit data. It should also be noted that data being supplied to transmit units 113A and 113B may emulate a yellow alarm condition. These bits would still be passed through to each of corresponding transmit transcoders 104A and 104B, respectively.

Also shown in FIGS. 1 and 2 are receive unit 115A for digroup A and receive unit 115B for digroup B. Each of receive units 115A and 115B include, among other elements, SF re-framer 116. Each of receive units 115A and 115B are known in the art and are commercially available from American Telephone and Telegraph Company. Receive unit 115A supplies as an output inband yellow alarm bit indicator RNB2-A which is supplied to alarm unit 112A and RPAM-A which is supplied to corresponding channel units. Similarly, receive unit 115B supplies as an output yellow alarm bit indicator RNB2-B which is supplied to alarm unit 112B, RPAM-B which is supplied to corresponding channel units and an output on the BRFAL-B lead. The signal on the BRFAL-B lead is either a logical 1 or a logical 0 and is employed in alarm unit 112B to indicate that it is operating in digroup B, as will be explained below. It should be noted that indicators RNB2-A and RNB2-B would include any data bits which emulate a yellow alarm condition. Also supplied as an output from digroup A and digroup B is the PCM output from receive transcoder 105A, namely, RNPCM-A, and receive transcoder 105B, namely, RNPCM-B, respectively. The RNPCM-A and RNPCM-B signals are supplied to corresponding dataport type channel units for use in well known fashion.

When operating in the DS1 Super Frame mode the yellow alarm bits are inband, i.e., in the second bit position of each time slot of each frame. Thus, for digroup A the inband yellow alarm bits are passed through by SF/ESF re-framer 108 and SF framer 109 of receive transcoder 105A to receive unit 115A and, therein, to SF re-framer 116. These inband yellow alarm bits are supplied via RNB2-A to alarm unit 112A for use as described below. Similarly, when digroup B is operating in the DS1 Super Frame mode, the inband yellow alarm bits are passed through receive transcoder 105B to receive unit 115B and, in turn, via RNB2-B to alarm unit 112B. It should be noted that in the prior channel banks when operating in the ESF framing mode any data emulating a yellow alarm condition would also be passed through to receive unit 115A and receive unit 115B and would cause a corresponding alarm control unit to declare an erroneous, i.e., false, yellow alarm condition.

Each of alarm units 112A and 112B includes selector unit 117, alarm control unit (ACU) 118 and driver 119. Alarm control unit 118 is known in the art and is commercially available from American Telephone and Telegraph Company. Details of alarm control unit 118 are described in the *Bell System Technical Journal* noted above. Alarm control unit 118 monitors outputs LOSP' and RNB2' from selector unit 117 to detect incoming alarms and the like. Additionally, it initiates alarms in response to various status information from the digital channel bank, i.e., STATUS shown in FIGS. 1 and 2. To this end, alarm control unit 118 generates TOGA which indicates whether or not a yellow alarm condition is being declared. TOGA is supplied to driver 119. Driver 119 is responsive to signal VT from selector unit 117 to a signal representative of TOGA, namely, TOGA', which is a current based signal when the digroup is operating in the new ESF yellow alarm mode and which is a voltage based signal when the digroup is operating in the old SF yellow alarm mode. The current based TOGA' signal is realized through voltage regulation provided by inhibitor and detector unit 110 in the new line interface units. The voltage based TOGA' signal is realized because there is no voltage regulation provided in the old line interface units. Signal TOGA' is supplied to the YA input of a corresponding transmit unit and to a corresponding inhibitor and detector. Thus, in digroup A, TOGA'-A is supplied to the YA input of transmit unit 113A and to inhibitor and detector 110A and in digroup B, TOGA'-B is supplied to the YA input of transmit unit 113B and to inhibitor and detector 110B. Selector unit 117 is supplied with LOSP, RNB2 and BRFAL and is operative to generate LOSP' and RNB2', as described below in conjunction with FIG. 5. Selector unit 117 also generates signal VT, which indicates whether the corresponding digroup is operating in either the old SF yellow alarm mode or the new ESF yellow alarm mode. As noted above, the mode of operation, i.e., old SF or new ESF, of the digroups in the channel bank is set upon installation of the corresponding line interface unit, i.e., old or new, in the digital channel bank. Selector unit 117 is also responsive to the supplied signals to automatically determine the mode of operation, in accordance with the present invention, as to whether the line interface unit 101 is equipped with inhibitor and detector 110 and MUX and transmitter 111. That is, each of the alarm units automatically detects whether or not it is operating with a "new" LIU equipped in accordance with the invention. This is important so that the alarm units in the channel bank can automatically select their particular mode of operation of interfacing with the new line interface unit 101 which is equipped, in accordance with the invention, to inhibit inband yellow alarm bits from being transmitted and to ignore possible received inband yellow alarm bits when operating in an ESF framing mode. Selector unit 117 is also responsive to signal BRFAL to determine which digroup it is operating in, i.e., A or B. This is important in the new ESF yellow alarm mode of operation in conjunction with a new line interface unit 101 so that the appropriate yellow alarm information is selected from LOSP.

FIG. 4 shows in simplified form details of inhibitor and detector 110 employed in line interface unit 101. It is noted that inhibitor and detector 110 is only equipped in new line interface units 101, which operate in accordance with the invention. Accordingly, shown are current-to-voltage converter 401 and comparator 402. Signal TOGA' is supplied to current-to-voltage converter 401 from a corresponding alarm unit 112 and, therein, from driver 119. As indicated above, when operating in the new ESF yellow alarm mode, a current based signal on TOGA' is representative of the state of the yellow alarm condition. Current to voltage converter 401 is operative to originate a first control signal which is a predefined signal and, in this example, a reference potential at its input. This reference potential, in one example, is a virtual ground potential, e.g., a logical 0, obtained in known fashion from an operational amplifier operating, for example, as a voltage regulator. Returning to FIGS. 1 and 2, the virtual ground potentials from inhibitor and detector 110A and from inhibitor and detector 110B are supplied to the YA inputs of transmit units 113A and 113B, respectively. Since, in the existing transmit units 113A and 113B, the YA input is sensitive to a voltage based signal, the supplied virtual ground potential inhibits, in accordance with the invention, any inband yellow alarm indication from being supplied to either of transmit units 113A or 113B. Returning to FIG. 4, current-to-voltage converter 401 causes TOGA' to be a current based signal by regulating it to be at the virtual ground potential and is responsive to TOGA' to supply as an output a voltage representative of the state of the yellow alarm condition. Comparator 402 compares the voltage output from current-to-voltage converter 401 to reference voltage $V_R$ to yield a logical 1 representative of a yellow alarm condition or a logical 0 representative of no such yellow alarm condition. Reference voltage $V_R$ sets the current threshold on TOGA'. As shown in FIG. 1, this yellow alarm information, namely, TYEL-A and TYEL-B, from inhibitor and detector 110A and 110B, respectively, is supplied to corresponding transmit transcoder units 104A and 104B and, therein, to SF/ESF framer 107. Again, in the new ESF yellow alarm mode, SF/ESF framer 107 inserts the yellow alarm status into the ESF data link and in the old SF yellow alarm mode inserts the inband yellow alarm bits in bit position two (2) of each time slot in a SF frame.

FIG. 5 depicts in simplified form details of selector unit 117 employed in alarm units 112A and 112B. Accordingly, shown are receiver and demultiplexer (DEMUX) 501, data selector 502 and detector 503. Receiver and demultiplexer 501 is supplied with LOSP and is operative in the new ESF yellow alarm mode to demultiplex the yellow alarm information from LOSP to yield digroup A yellow alarm information AYA and digroup B yellow alarm information BYA. It also generates a logical 1 VT signal when operating in the new ESF yellow alarm mode and a logical 0 VT signal when operating in the old SF yellow alarm mode. Data selector 502 is supplied with LOSP, AYA and BYA from receiver and demultiplexer 501, RNB2 and SEL from detector 503. Detector 503 is responsive to BRFAL to generate a logical 0 SEL signal for BRFAL-A, i.e., digroup A, and a logical 1 SEL signal for BRFAL-B, i.e., digroup B. As indicated above, BRFAL-A is an open circuit and BRFAL-B is either a logical 1 or a logical 0. Detector 503 is able to distinguish in known fashion between BRFAL being either an open circuit, or logical 1 or logical 0. In this manner, selector unit 117 automatically determines the digroup which the corresponding alarm unit is operating in. SEL is supplied to the A select input of data selector 502 and VT is supplied to the B select input. Operation of data selector 502 in supplying as outputs LOSP' and RNB2' is set forth in the TABLE shown in FIG. 6. Thus, when VT is a logical 0, selector 117 selects the old SF yellow alarm mode of operation and the inband yellow alarm bits, namely, RNB2 are supplied as output RBN2'. When VT is a logical 1, i.e., operating in the new ESF yellow alarm mode, and SEL is a logical 0, the digroup A yellow alarm bits AYA are supplied as output RNB2' and when VT is a logical 1 and SEL is a logical 1, the digroup B yellow alarm bits BYA are supplied as output RNB2'. Therefore, it is seen that when operating in the new ESF yellow alarm mode any inband data bits emulating a yellow alarm condition are ignored, in accordance with the invention.

We claim:

1. A digital line interface unit for interfacing a digital channel bank to at least one DS1 digital transmission line comprising:

at least a first transmit transcoder including means for formatting channel signals into a DS1 Super Frame format having a predetermined number of time slots in a frame and a predetermined number of frames in a Super Frame, means for formatting channel signals into a DS1 Extended Super Frame format signal including a data link, means for inserting prescribed yellow alarm information into said data link of a DS1 Extended Super Frame signal being formatted and means for inserting prescribed yellow alarm information in a predetermined bit position of time slots of a DS1 Super Frame signal being formatted; and means for originating a first control signal to inhibit insertion of said prescribed yellow alarm information into said predetermined bit position of time slots of the DS1 Super Frame formatted signal when said at least first transmit transcoder is set to supply the DS1 Extended Super Frame signal being formatted as an output to said at least one DS1 digital transmission line.

2. A line interface unit as defined in claim 1 wherein said first control signal comprises a predefined reference signal.

3. A line interface unit as defined in claim 2 wherein said predefined reference signal is a virtual ground potential.

4. A line interface unit as defined in claim 2 wherein said predefined reference signal is a logical 0.

5. A line interface unit as defined in claim 1 further including means responsive to a second signal for detecting a prescribed yellow alarm condition.

6. A line interface unit as defined in claim 5 wherein said means for originating causes said second signal to be a current based signal.

7. A line interface unit as defined in claim 6 wherein said means for originating and said means for detecting include current-to-voltage converter means responsive to said second signal for generating a voltage representative of whether yellow alarm information is present and means for comparing said voltage to a threshold potential to generate a signal representative of a corresponding yellow alarm condition.

8. A line interface unit as defined in claim 1 further including at least one receive transcoder comprising means for re-framing a DS1 signal formatted in the Extended Super Frame format and for obtaining first prescribed yellow alarm information from a data link in said DS1 extended super frame formatted signal and means for multiplexing said first prescribed yellow alarm information with prescribed yellow alarm information from other means for re-framing a DS1 signal formatted in the Extended Super Frame format and for transmitting said multiplexed prescribed yellow alarm information to an alarm unit in the channel bank.

9. An alarm unit for use in a digital channel bank including first and second digroups for interfacing associated framer units to first and second DS1 digital transmission lines, respectively, comprising:

an alarm control unit responsive to supplied signals for generating a signal indicative of whether a prescribed yellow alarm condition exists and being responsive to supplied yellow alarm information for declaring the existence of a prescribed yellow alarm condition; and selector means supplied with a signal which transports new extended super frame yellow alarm information for said first and second digroups and a signal including superframe inband yellow alarm information for an associated one of said digroups and being responsive to control signals for controllably selecting as said supplied yellow alarm information either said new extended super frame yellow alarm information for said first digroup, said new extended super frame yellow alarm information for said second digroup or said superframe inband yellow alarm information.

10. An alarm unit as defined in claim 9 wherein said selector means includes means responsive to a digroup identification signal for generating one of said control signals which is indicative of a digroup which said alarm unit is associated with.

11. An alarm unit as defined in claim 10 further including driver means responsive to a supplied predefined reference signal for generating a current based signal representative of a yellow alarm condition when operating in a new extended superframe yellow alarm mode.

12. An alarm unit as defined in claim 11 wherein said driver means is operative to generate a voltage based signal in the absence of said predefined reference signal when operating in an old superframe yellow alarm mode.

13. A digital channel bank for interfacing channel units in first and second digroups to first and second DS1 digital transmission lines, respectively, comprising:

a digital line interface unit for interfacing a digital channel bank to said first and second DS1 digital transmission lines including a first transmit transcoder including means for formatting channel signals into a DS1 Super Frame format having a predetermined number of time slots in a frame and a predetermined number of frames in a Super Frame, means for formatting channel signals into a DS1 Extended Super Frame format signal including a data link, means for inserting first prescribed yellow alarm information into said data link of a DS1 Extended Super Frame signal being formatted by said first transmit transcoder, means for inserting first prescribed yellow alarm information in a predetermined bit position of time slots of a DS1 Super Frame signal being formatted in said first transmit transcoder, and means for originating a first control signal to inhibit insertion of said first prescribed yellow alarm information into said predetermined bit position of time slots of the DS1 Super Frame signal being formatted when the first transmit transcoder is set to supply the DS1 Extended Super Frame formatted signal as an output to said first DS1 digital transmission line, and a second transmit transcoder including means for formatting channel signals into a DS1 Super Frame format having a predetermined number of time slots in a frame and a predetermined number of frames in a Super Frame, means for formatting channel signals into a DS1 Extended Super Frame format signal including a data link, means for inserting second prescribed yellow alarm information into said data link of a DS1 Extended Super Frame signal being formatted by said second transmit transcoder, means for inserting second prescribed yellow alarm information in a predetermined bit position of time slots of a DS1 Super Frame signal being formatted in said second transmit transcoder and means for originating a second control signal to inhibit insertion of said second prescribed yellow alarm information into said predetermined bit position of time slots of the DS1 Super Frame being formatted when the second transmit transcoder is set to supply the DS1 Extended Super Frame formatted signal as an output to said second DS1 digital transmission line;

a first alarm unit including means responsive to said first control signal for generating a current based signal indicative of said first prescribed yellow alarm information; and a second alarm unit including means responsive to said second control signal for generating a current based signal indicative of said second prescribed yellow alarm information.

14. A digital channel bank as defined in claim 13 wherein each of said first and second control signals comprises a predefined reference signal.

15. A digital channel bank as defined in claim 14 wherein said predefined reference signal is a virtual ground potential.

16. A digital channel bank as defined in claim 14 wherein said predefined reference signal is a logical 0.

* * * * *